June 18, 1968 H. E. NICHOLS, JR 3,388,492

ANIMAL EAR TAG

Filed July 12, 1966

INVENTOR
Harley E. Nichols, Jr.
BY
Ernest A. Jensen
ATTORNEY

United States Patent Office 3,388,492
Patented June 18, 1968

3,388,492
ANIMAL EAR TAG
Harley E. Nichols, Jr., Hardwick, Vt., assignor to C. H. Dana Co. Inc., Hyde Park, Vt., a corporation of New Hampshire
Filed July 12, 1966, Ser. No. 564,674
4 Claims. (Cl. 40—301)

ABSTRACT OF THE DISCLOSURE

An animal ear tag for identifying domestic cattle such as sheep, cows, etc. including a tag member which is freely swiveled in a bushing member extending through a hole in the ear so that the hole will not be enlarged. The tag member has a post on one side with a tapered, yieldable enlargement at the free end for engagement with a flange on the bushing member. Provision is made for growth in the thickness of the ear. The tag member has an aperture in the lower end and a symbol member is snap fitted into the aperture.

---

Heretofore, numerous ear tags for animals have been proposed. These ear tags generally were of two types. One type was clamped onto the ear and did not take into consideration the growth in thickness of the animal's ear. The other type included a pin or stud which passed through the ear for allowing the tag connected thereto to rotate with respect to the ear, whereby the hole pierced in the ear became enlarged and the ear tag could become dislodged and be lost.

Accordingly, an object of the present invention is to provide an ear tag which is not subject to the foregoing disadvantages.

Another object is to provide an ear tag which swivels in a non-rotating cylinder mounted in the ear whereby the hole in the ear is not enlarged.

Another object is to provide such an ear tag which cannot be dislodged from the ear once applied.

Another object is to provide such an ear tag wherein parts are connected in a manner to give the ear tag a very low loss rate.

Another object is to provide such an ear tag bearing indicia and a removable symbol member.

A further object is to accomplish the foregoing in a simple, practical and economical manner.

Figure 1:
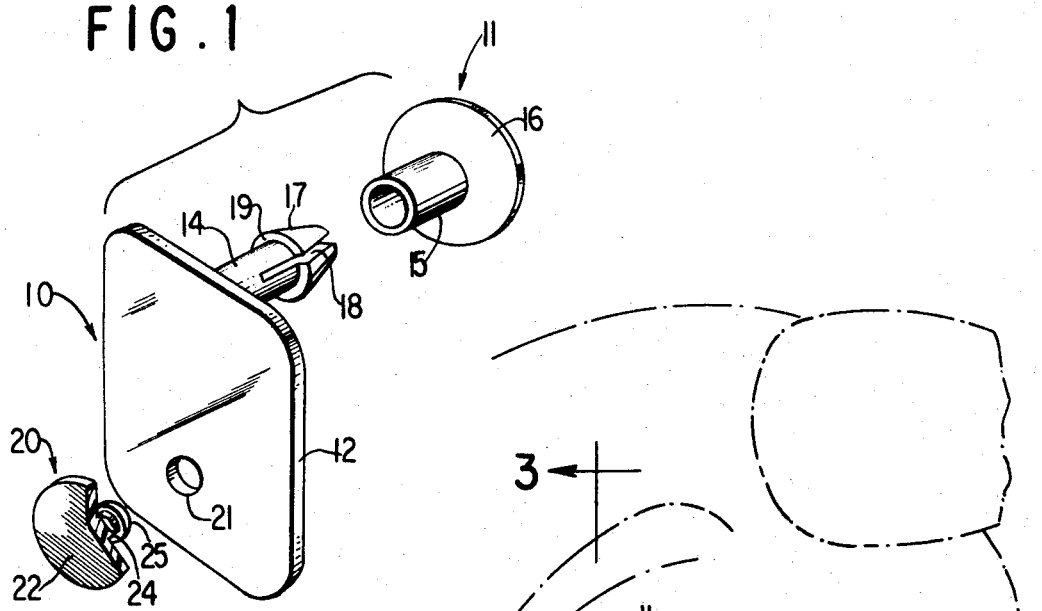
FIG. 1 is an exploded perspective view of an ear tag in accordance with the present invention.

Referring now to the drawing in detail, there is shown an ear tag which generally comprises a tag member 10 and a bushing member 11.

The tag member 10 includes a relatively thin plate portion 12 having indicia on the front thereof such as a number, and a circular post 14 at the other side of the plate portion and perpendicular thereto. As shown herein, the post is near the top of the plate portion so that the plate portion dangles on the bushing member and the indicia assumes an upright position. For purpose of creating a pleasing appearance, the plate portion has a generally rectangular shape. The sides are parallel, the bottom is perpendicular to the sides with the lower corners rounded, and the top is arcuate.

Figure 2:
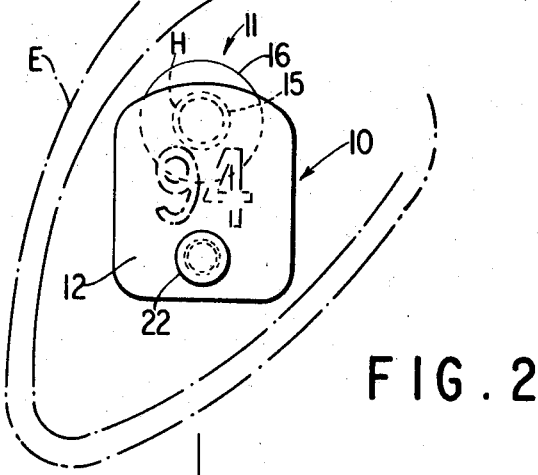
FIG. 2 is a side view of the ear tag as assembled and attached to an animal ear shown in broken lines.
Figure 3:
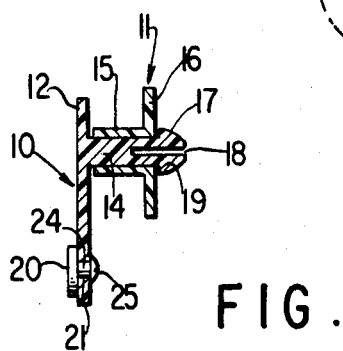
FIG. 3 is a sectional view taken along the line 3—3 on FIG. 2.

The bushing member 11 includes a cylindrical tubular sleeve 15 for extending through a hole H in the ear E (FIG. 2), and an enlarged flange 16 at one end of the sleeve for facing the back of the ear.

In order to secure the tag and bushing members, the post 14 has a tapered enlargement 17 at the free end thereof which is split longitudinally through its center at 18, and is provided with a face 19 for overlying the flange 16 and engaging the same to lock the tag and bushing members against separation.

The enlargement 17 is yieldable whereby it can be squeezed together when inserted through the sleeve and after passing therethrough can expand to provide the interlock between the tag and bushing members. Preferably, the tag and bushing members are formed of a yieldable but relatively rigid plastic material such as nylon. Also, the post 14 and the sleeve 15 are dimensioned to mount the tag member for rotational or swiveling motion with respect to the bushing member. When the tag member and the bushing member are interlocked, it is desirable that the free end of the sleeve is closely adjacent the rear or post side of the plate portion 12 but is sufficiently spaced therefrom to allow for growth of the thickness of the ear.

The tag member 10 lends itself to embellishment by a symbol member 20 which is available in different colors to symbolize certain facts pertaining to the cattle. The symbol member is removably snap fitted into an aperture 21 in the plate portion 12. The symbol member includes a body 22 which is displaced at the front of the plate portion, a stem 24 on the body which extends through the aperture, and a head 25 at the free end of the stem which engages the rear of the plate portion. The symbol member, like the tag member, also is formed of a yieldable plastic material to enable the head 25 to be sprung into and out of the aperture 21.

In use, the colored symbols are first installed by pressing the symbol member into the aperture of the membered plate portion so that the head snaps in.

A smooth round hole H is formed in the ear E with a punch. This is the only tool required. The sleeve 15 of the bushing member 11 is inserted from the back of the ear and is pushed through the hole until the flange 16 contacts the back of the ear. The post 14 of the tag member 10 now is inserted in the bushing member sleeve 15 at the front and is pushed until the enlargement 17 clicks as it locks itself behind the flange 16.

While holding the ear, the installed tag is pushed back until the plate portion 12 contacts the front of the ear to thereby provide a space between the back of the ear and the flange 16 which allows for the drainage of any blood from the punched out hole H.

I claim:

1. An animal ear tag comprising a tag member having a cylindrical post on one side thereof near its top and having indicia on the other side thereof, and a bushing member having a cylindrical sleeve for extending through a hole in an animal's ear and having a flange at one end thereof, said post having a longitudinally split tapered, yieldable enlargement at the free end thereof for insertion through said sleeve and for engagement of said flange to lock said members against separation, said post and sleeve being dimensioned to freely swivel said tag member on said bushing member so that the indicia assumes an upright position and being dimensioned to position the free end of the sleeve in spaced relation to the post side of said tag member when said enlargement engages said flange so that a space is provided between said tag member and said flange which accommodates a growth in the thickness of the animal's ear.

2. An ear tag according to claim 1, wherein said post is at the upper end of said tag member, said tag member has an aperture adjacent the lower end thereof, and a symbol member is snap fitted into said aperture.

3. An ear tag according to claim 2, wherein said indicia is above said symbol member.

4. An ear tag according to claim 2, wherein said symbol member includes a body and a stem extending through said aperture and formed with a head for engaging the post side of said tag member to lock said symbol and member thereon.

References Cited

UNITED STATES PATENTS

| | | | |
|---|---|---|---|
| 350,112 | 10/1886 | Burrows | 40—301 |
| 1,159,593 | 11/1915 | Lindeberg | 40—301 |
| 2,125,768 | 8/1938 | Christensen et al. | 40—300 XR |
| 3,260,007 | 7/1966 | Hayes | 40—301 |

FOREIGN PATENTS

| | | |
|---|---|---|
| 15,055 | 1892 | Great Britain. |

EUGENE R. CAPOZIO, *Primary Examiner.*

W. GRIEB, *Examiner.*